United States Patent [19]

Grauz et al.

[11] Patent Number: 4,862,151
[45] Date of Patent: Aug. 29, 1989

[54] REMOTE CONTROL DEVICE FOR A COMPUTER ASSOCIATED WITH A VIDEO SCREEN

[75] Inventors: Daniel Grauz, Montigny le Bretonneux; Claude Marchal, Garancieres, both of France

[73] Assignee: Societe Francaise d'Equipements Pour la Navigation Aerienne (SFENA), Velizy-Villacoublay, France

[21] Appl. No.: 197,346

[22] Filed: May 23, 1988

[30] Foreign Application Priority Data

May 25, 1987 [FR] France ................. 87 07322

[51] Int. Cl.4 .............................. G09G 1/00
[52] U.S. Cl. ......................... 340/706; 340/709; 340/712; 178/18
[58] Field of Search ............... 340/706, 707, 708, 709, 340/710, 711, 712; 341/33, 34; 178/18, 19, 20; 273/148 B; 74/471 XY; 200/46, 48 A, 6 A, 5 A

[56] References Cited

U.S. PATENT DOCUMENTS

| | | |
|---|---|---|
| 4,246,452 | 1/1981 | Chandler ........................... 340/709 |
| 4,550,221 | 10/1985 | Mabusth ............................ 340/712 |
| 4,654,647 | 3/1987 | Wedam ............................. 340/709 |
| 4,692,756 | 9/1987 | Clark ................................ 340/706 |
| 4,736,191 | 4/1988 | Matzke et al. ..................... 340/710 |
| 4,799,049 | 1/1989 | Avila ................................ 340/710 |

FOREIGN PATENT DOCUMENTS

| | | |
|---|---|---|
| 0166432 | 1/1986 | European Pat. Off. . |
| 2570849 | 3/1986 | France .............................. 340/709 |
| 0017679 | 1/1984 | Japan ................................ 178/18 |
| 2139762 | 4/1984 | United Kingdom ............. 340/709 |
| 2152250 | 7/1985 | United Kingdom . |
| 82/02107 | 1/1982 | World Int. Prop. O. ......... 178/18 |

Primary Examiner—David K. Moore
Assistant Examiner—M. Fatahiyar
Attorney, Agent, or Firm—Gerald J. Ferguson, Jr.

[57] ABSTRACT

The device according to the invention comprises a member (8) for selecting and changing a data item displayed on a video screen, a switch associated with the member for selecting and modifying a data item, and means providing a connection between the remote control device and the computer. The device is characterized in that the member for selecting and modifying a data item is a touch-sensitive pad (8) movably mounted on a support (6), and in that the switch is disposed to be actuated by displacing the touch-sensitive pad (8).

4 Claims, 1 Drawing Sheet

U.S. Patent
Aug. 29, 1989
4,862,151
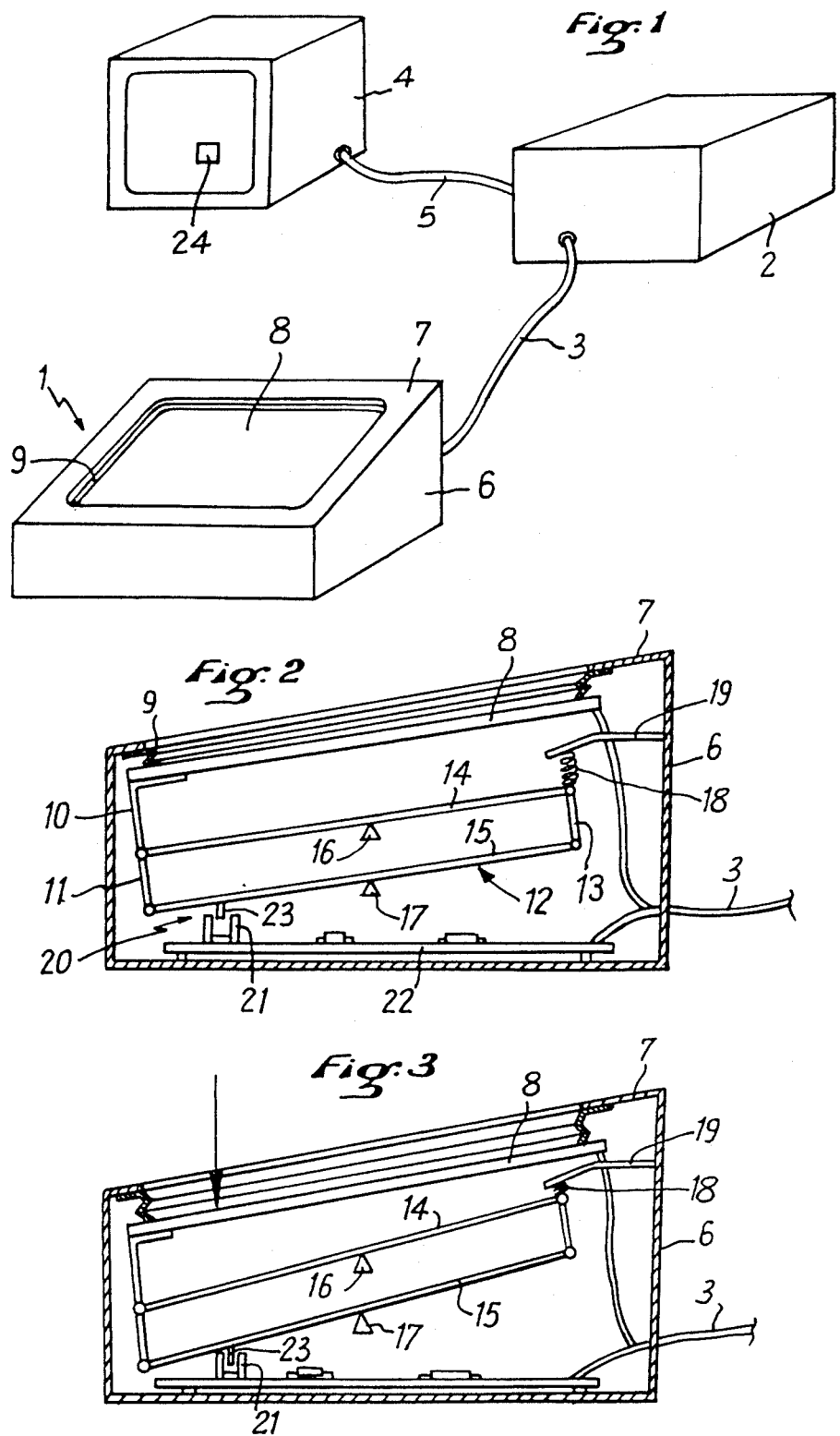

REMOTE CONTROL DEVICE FOR A COMPUTER ASSOCIATED WITH A VIDEO SCREEN present invention relates to a remote control device for a computer associated with a video screen.

BACKGROUND OF THE INVENTION

Remote control devices for computers are now extremely widespread, with a very well-known device being commonly called a "mouse"Such a device comprises a member, generally a wheel or a ball, for selecting and changing a data item displayed on a video screen, and a switch associated with the member for selecting and changing data, and with the assembly generally being connected to the computer by a cable. By displacing the device over a plane, the member for selecting and changing data is moved and a pointer moves correspondingly over the screen, after which an action on the switch serves to confirm the selected data, or else to switch to another function, for example displaying another page of data on the video screen. The use of such a device requires that a stable, plane, support is available, otherwise the "mouse" will move on its own over the support when not held in the operator's hand.

This constraint is generally incompatible with remotely controlling a computer on board an aircraft, or more generally, on board a vehicle.

Remote control devices are also known which comprise a magnetic pad over which a stylus including a switch is moved, with displayed data being selected or modified by moving the stylus over the pad and then by confirming the data using the switch. Hereagain, the device suffers from the drawback of requiring a moving accessory which must therefore be held in place when not in use. Further, when a device of this type is used on board an aircraft which may be subjected to sudden movements, it is relatively difficult to accurately control the position of the stylus on the magnetic pad.

An object of the present invention is to provide a remote control device for a computer associated with the video screen which is easy to manipulate and which is accurate regardless of the conditions under which it is used, in particular on board an aircraft.

SUMMARY OF THE INVENTION

In order to achieve this object, the invention provides a remote control device for a computer associated with a video screen, said device comprising a member for selecting and changing a data item displayed on the video screen, a switch associated with the member for selecting and changing a data item, and connection means between the remote control device and the computer, wherein the member for selecting and modifying a data item is a touch-sensitive pad movably mounted on a support, and wherein the switch is disposed to be actuated by displacing the touch-sensitive pad.

Thus, a data item is selected and changed by moving a finger over a touch-sensitive pad, which can generally be done with accuracy even when the control device is mounted on board an aircraft, and the switch is actuated by displacing the touch-sensitive pad, which can be done using the same finger as has just been moved over the pad.

In an advantageous version of the invention, touch-sensitive pad is rigidly associated with one of the sides of a parallelogram linkage which is mounted to pivot about an axis parallel to the touch-sensitive pad and which is returned to a rest position by resilient means, and the switch is also associated with one of the sides of the parallelogram linkage. Thus, the switch is operated merely by pressing down the touch-sensitive sensitive pad, and the force required to operate the switch is constant regardless of the position where the operator's finger is applied to press the pad.

In accordance with another advantageous aspect of the invention, the touch-sensitive pad is surrounded by a frame associated with the support and is connected to the frame by a flexible sealing gasket. This prevents any foreign matter from penetrating into the control device.

BRIEF DESCRIPTION OF THE DRAWINGS embodiment of the invention is described by way of example with reference to the accompanying drawings, in which:

FIG. 1 is a diagram showing the connections between the remote control device, the computer, and the video screen;

FIG. 2 is a partially diagrammatic section view of the control device in accordance with the invention when in its rest position; and FIG. 3 is a view similar to FIG. 2 showing the switching position of the control device in accordance with the invention.

MORE DETAILED DESCRIPTION

With reference to the figures, the remote control device in accordance with the invention, given overall reference numeral 1, is associated in conventional manner with a computer 2 by a connection cable 3. The computer 2 is itself connected to a video screen 4 via a connection cable 5. The remote control device 1 comprises a housing 6 whose top face constitutes a frame 7 for a touch-sensitive pad 8 which is connected to the frame 7 by a flexible seal, for example an annular rubber bellows.

Further, the touch-sensitive pad 8 is rigidly associated, e.g. by means of a bracket 10, to one side 11 of a parallelogram linkage given overall reference numeral 12 and comprising a vertical side 13 opposite to the side 11, and two slightly sloping sides given respective references 14 and 15 whose ends are hinged to the sides 11 and 13 in order to form the parallelogram 12, and which are supported in their respective middles on blades 16 and 17 which are suitably connected to the support housing 6 in a manner which is not shown. The parallelogram linkage 12 is urged to its rest position shown in FIG. 2 by resilient means such as a helical spring 18 disposed between one side of the parallelogram linkage 12 and a bracket 19 mounted on the housing 6. A switch given overall reference 20 comprises an opto-electronic fork 21 fixed on a plate 22 with a downwardly projecting blade 23 being disposed facing it on the bottom side 15 of the parallelogram 12. The plate 22 also includes components for powering the opto-electronic fork 21 and for transmitting the switching signal which is obtained when the blade 23 penetrates between the two branches of the fork 21.

The device in accordance with the invention operates as follows: the computer 2 displays a certain amount of data in conventional manner on the video screen 4, and on board an aircraft, such data may be the heading, the altitude, and the airspeed of the aircraft, for example. When a data item is to be changed, the item is initially selected by pressing a finger on the touch-sensitive pad 8 without depressing the pad as a whole. A pointer 24 then appears on the screen at a location corresponding to the position of the finger on the pad. In this context, it may be observed that the touch-sensitive pad may be of any known type which is sensitive to finger contact, for example comprising a series of capacitive areas, and suitable for transmitting information to the computer 2 indicative of the position on the pad of a finger. The pointer 24 may also be constituted by any suitable type of signal on a video screen, for example by changing the color of the screen in the zone concerned by the selection. If the pointer does not coincide with the data item which the operator wishes to change, the operator moves his finger over the touch-sensitive pad until the pointer does coincide with the item which is to be changed. Once the pointer 24 coincides with the item which the operator seeks to change, the operator depresses the pad simply by exerting pressure thereon using the same finger which has just been used to move the pointer. The paralleloram 12 then tilts on the knife edges 16 and 17 and compresses the spring 18, causing the blade 23 to penetrate between the branches of the fork 21 and thus confirming previously-performed selection and causing a subsequent processing stage to be engaged, for example changing the selected data item. In order to perform the change itself, the operator releases the pad which returns to the rest position shown in FIG. 2 under the return force of the spring 18 and then moves his finger over the pad in an appropriate direction as a function of the computer program, for example upwards if the number to be changed is to be increased or downwards if the number to be changed is to be decreased, and this continues until the desired value appears on the video screen 4. The new value is then confirmed by depressing the touch-sensitive pad again, with said motion causing the program to move on again to the following function, for example to return to waiting for a new data item to be selected for the purpose of being changed.

It may be observed, that depending on the program used, the pad can be used to change a data item overall or digit-by-digit.

Naturally the invention is not limited to the embodiment described and modifications can be made thereto without going beyond the scope of the invention. In particular, if the pad is small in size, it may be suspended on means which are simpler than a parallelogram linkage. It is also possible to attribute functions other than those described to a remote control device in accordance with the invention.

We claim:

1. A remote control device for a computer associated with a video screen, said device comprising a member for selecting and changing a data item displayed on the video screen, a switch associated with the member for selecting and changing a data item, and connection means between the remote control device and the computer, wherein the member for selecting and modifying a data item is a touch-sensitive pad movably mounted on a support, and wherein the switch is disposed to be actuated by displacing the touch-sensitive pad.

2. A remote control device according to claim 1, wherein the touch-sensitive pad is rigidly associated with one of the sides of a parallelogram linkage which is mounted to pivot about an axis parallel to the touch-sensitive pad and which is returned to a rest position by resilient means, and wherein the switch is also associated with one of the sides of the parallelogram linkage.

3. A remote control device according to claim 1, wherein the touch-sensitive pad is surrounded by a frame associated with the support and is connected to the frame by a flexible sealing gasket.

4. A remote control device according to claim 3, wherein the flexible sealing gasket is constituted by an annular bellows.

* * * * *